Nov. 27, 1928.
D. M. REEVES
1,693,527
AERIAL PHOTOGRAPH INTERPRETER
Filed March 21, 1923    2 Sheets-Sheet 1
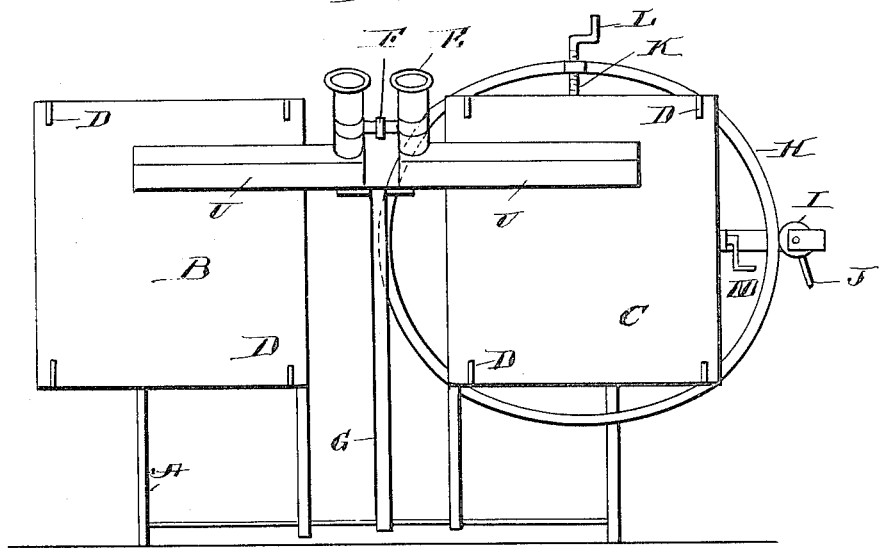
Inventor
Dache M. Reeves,
By Robert H. Young
Attorney Nov. 27, 1928.
D. M. REEVES
1,693,527
AERIAL PHOTOGRAPH INTERPRETER
Filed March 21, 1923　　2 Sheets-Sheet 2
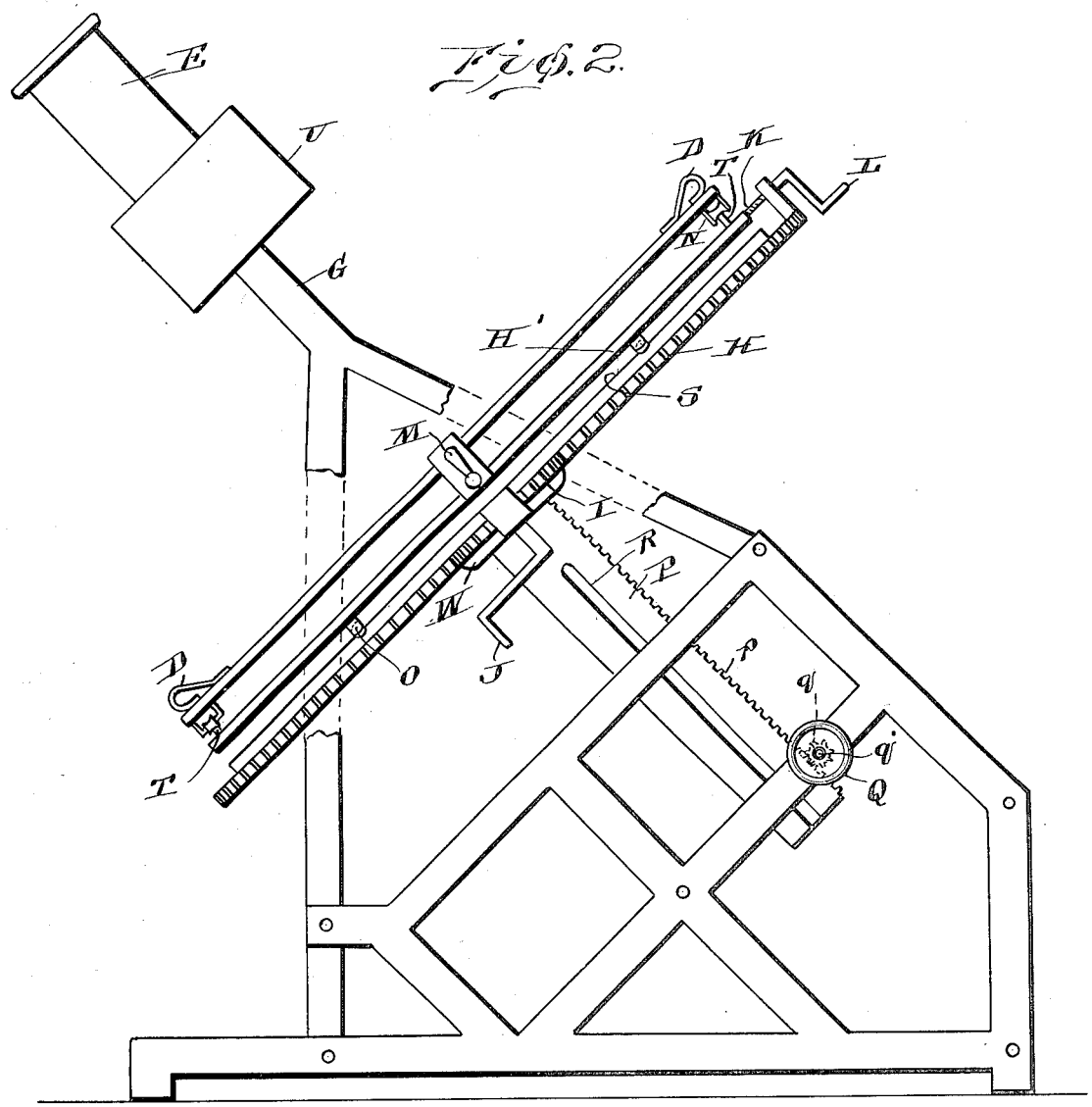

Patented Nov. 27, 1928.

1,693,527

UNITED STATES PATENT OFFICE.

DACHE M. REEVES, OF BELLEVILLE, ILLINOIS.

AERIAL PHOTOGRAPH INTERPRETER.

Application filed March 21, 1923. Serial No. 626,551.

This invention relates to an aerial photograph interpreter or machine or apparatus for focally alining and causing to register two photographs taken on different scales of the same subject matter, whereby a quasi-stereoscopic effect is produced for the purpose of disclosing any changes or variations which have taken place in the interim between the exposures.

If two aerial photographs of the same subject matter or topographical area are viewed simultaneously with a stereoscope, no stereoscopic effect is apparent but instead, the photograph appears as a single flat picture. If, however, the two pictures or photographs are not identical, but an object appears on one that was not present when the other was taken, such object appears to be above or below the plane of the picture.

Suppose for example, a picture is taken of a section of an enemy trench. The enemy camouflages a portion of said trench later and also builds a new trench. If another picture is now taken and viewed in a stereoscope, the portion of the trench which has been concealed appears above the picture and the new portion appears below. Whether an object appears above or below the picture depends on whether it is present on the left hand or right hand picture or photograph as placed in the instrument. By placing pictures of the same area, taken at different times, in the stereoscope, any changes may be quickly noted. However, the ordinary stereoscope cannot be used for this work as frequently two pictures of the same subject matter or area will be at different scales. It is necessary therefore, to have a means for adjusting the pictures until both of them appear at the same scale.

The object of the present invention is to provide apparatus of the character referred to of such nature that two photographs taken of the same portion of ground at different times may be viewed stereoscopically just as though they had been taken at the same time from the same altitude and from the same point overhead. Briefly stated, this is accomplished by the use of two platforms on which the photographs are placed, one platform being provided with means to quickly and accurately adjust one photograph with respect to the other so that the effect is the same as though both pictures were taken at the same scale. To do this the movable platform must be capable of being raised and lowered and means must also be provided for shifting the picture thereon forward or backward, and also partially rotating the same in order that both photographs may be brought to the same scale and caused to register.

With the above and other objects in view, the invention consists in the novel construction, combination and arrangement herein shown, described and claimed.

In the accompanying drawings.

Figure 1 is a front elevation of the interpreter.

Figure 2 is a side elevation of the same partly in section.

The instrument, machine or apparatus in the illustrated embodiment thereof, comprises a suitable supporting frame A, picture or photograph supporting platforms B and C and an optical unit E. The platform B is fixed or stationary but the platform C is mounted on the adjusting column P which is slidable in the direction of its length in relation to the frame A to which it is connected. The column P is formed with a guide groove R extending longitudinally thereon and being adapted to engage a projection on the frame A. This prevents the column P from axial or turning movement. The column is moved lengthwise by means of a pinion $q$ on a shaft $q'$ turned by means of a wheel or handle Q, the pinion $q$ engaging a rack face $p$ on column P.

A circular frame or annulus H is supported on an enlarged bearing portion W of the column P so that it may be rotated in relation to said column. The annulus H is adapted to be rotated by a gear I operated by a crank handle J and meshing with teeth on the periphery of the annulus H.

On top of the annulus H there are fastened two track rails S. A slidable frame H' is adapted to be moved along the track rails S, being supported by rollers O on said rails and operable by means of a worm screw K actuated by a crank handle L passing through an extension or bracket arm 1 of the annulus H.

The frame H' in turn has two track rails T fast thereon and extending at right angles to the rails S. The platform C has rollers journalled on the underside thereof, which move under the track rails T. Movement of the platform C is affected by a worm screw operated by a handle M passing through an extension or bracket arm n of the frame H'. Each of the platforms B and C is provided with spring clips D which serve to hold the pictures or photographs thereon.

The frame A also supports an optical unit E shown as consisting of eyepieces and also embodying oppositely extending arms U containing reflecting or refracting devices. The eyepieces are joined by a connection F adjustable to regulate the interocular or interpupillary distance between the same. All minor details such as stops at the ends of the track rails, guides and the like, are omitted for the sake of clearness. The optical unit should be arranged so that it may be swung out of the way to facilitate placing pictures on the platforms.

In operation, two photographs of the same field, area or subject matter taken at different times are placed on the platforms. The operator then adjusts the movable platform, rotating it if necessary until both photographs are properly centered or caused to register. The movable platform is then raised or lowered until both pictures are apparently at the same scale. To interpret the photographs, the pictures are first adjusted as above described until the image appears as a single flat picture. The movable platform is then shifted until the picture presents a stereoscopic image. If now there are any objects on one photograph which are not present on the other photograph, such objects will either appear to be above or below the plane of the picture. Hence, it is easy to pick out any changes in objects on the ground which have occurred in the interval between the times of taking the two photographs.

The eyepiece combination has two distinct functions; first, to aline the two pictures in the same position by means of prisms or reflectors and secondly, to magnify the details. The magnifying unit may be arranged so that it may be disconnected if necessary, until the adjustments are made. It would also be desirable to be able to vary the amount of magnification by having interchangeable lens units.

The apparatus is especially valuable for military purposes, enabling camouflaged positions of any object or objects when once photographed and later concealed, to plainly appear with a stereoscopic effect.

I claim:

1. In combination with a supporting frame, a pair of photograph-supporting platforms, an optical unit, and means for adjusting one of said platforms toward and away from said optical unit, and means for adjusting said adjustable platform laterally with respect to said optical unit in either or both of two directions transversely to each other.

2. In combination with a supporting frame, a pair of photograph-supporting platforms, an optical unit, and means for varying the magnification of a photograph placed upon one of said platforms, and means for moving one of said platforms in either or both of two directions transversely of each other.

3. In combination with a supporting frame, a pair of photograph-supporting platforms, an optical unit, and means for bringing photographs placed upon said platforms to the same apparent scale, and means for moving one of said platforms in either or both of two directions transversely of each other.

4. In combination with a supporting frame, a pair of photograph-supporting platforms, an optical unit, and means for adjusting and alining in all directions two photographs placed upon said platforms of the same subject but taken on different scales, until the images appear to be on the same scale and are coincident.

5. In combination with a supporting frame, a pair of photograph-supporting platforms, an optical unit, and means for adjusting and alining in all directions two photographs placed upon said platforms of the same subject but taken on different scales to produce a stereoscopic effect.

6. In combination with a supporting platform, an optical unit, a pair of photograph supporting platforms one of the same being fixed and the other thereof being movable to and away from the optical unit and rotatable relative thereto.

7. In combination with a supporting frame, an optical unit, a fixedly mounted photograph supporting platform, an annulus rotatable on said frame, a second photograph supporting platform and movable on said annulus and means for moving said second platform relative to said annulus.

8. In combination with a supporting frame, a pair of photograph-supporting platforms, an optical unit, one of said platforms being adjustable in a horizontal plane in two directions transversely of each other, and being adjustable towards and away from said optical unit.

9. In combination with a supporting frame, a pair of photograph-supporting platforms, an optical unit, one of said platforms being adjustable towards and away from said optical unit and being adjustable in either or both of two directions transversely of each other and perpendicular to said first line of adjustment.

10. In combination with a supporting frame, a pair of photograph-supporting platforms, an optical unit, one of said platforms being adjustable towards and away from said optical unit and rotatable in a plane perpendicular to the line of said first named adjustment.

In testimony whereof I affix my signature.

DACHE M. REEVES.